Patented May 26, 1953

2,640,044

UNITED STATES PATENT OFFICE 2,640,044

HEAT STABILIZATION OF POLYAMIDES

Gelu S. Stamatoff, Newark, Del., assignor to E. I. du Pont de Nemours and Company, Wilmington, Del., a corporation of Delaware No Drawing. Application May 24, 1951, Serial No. 228,120

6 Claims. (Cl. 260—45.7)

This invention relates to synthetic linear polyamides, and, more particularly, to the stabilization of polyamides against atmospheric degradation at elevated temperatures.

The nylon polyamides, that is the synthetic linear polyamides prepared from polymerizable mono-amino-carboxylic acids or their amide-forming derivatives, or from suitable diamines and suitable dicarboxylic acids or amide-forming derivatives of these compounds, possess a number of physical properties such as great toughness and high tensile strength which make them of great value in many applications. Preparation and use of such polymers are illustrated in U. S. Patents 2,071,250, 2,071,253, and 2,130,948. The polyamides described in these patents are high molecular weight polymers which have recurring carbonamide groups as an integral part of the main polymer chain and as a class are microcrystalline in structure. In general, these polyamides have intrinsic viscosities above 0.4 where intrinsic viscosity is defined as in U. S. Patent 2,130,948.

Synthetic linear polyamides when exposed to the atmosphere at elevated temperatures for fairly long periods of time undergo degradation which impairs those physical properties responsible for the toughnes and flexibility characteristics of such substances. In addition, these polyamides are badly discolored by exposure to atmospheric conditions, i. e. heat and light. The resulting brittleness and discoloration are undesirable in certain applications, such as electrical insulation, transparent films, bristles, cloth, coated fabrics and the like, wherein much dependence is placed upon maximum retention of toughness, flexibility, and original color during fabrication and service.

It is an object of this invention to stabilize the said high molecular weight synthetic linear polyamides against heat degradation or embrittlement that is encountered upon exposure for prolonged periods of time to elevated temperatures, particularly under atmospheric conditions. Other objects will be apparent from the hereinafter description of the subject invention.

French Patent 906,893 relates to stabilization of synthetic linear polyamides with copper compounds. Such copper compounds include metallic copper, copper acetate, copper formate, copper carbonate, cupric sulfite, etc. U. S. Patent 2,493,597 relates to stabilization of the viscosity of polyamides by means of certain phosphite esters, or related compounds. The present invention is directed to a process of improving the stability of synthetic linear polyamides with a combination of a phosphorus compound and an inorganic halide.

The objects of this invention are accomplished by incorporating in a synthetic linear polyamide a stabilizer composition comprising a phosphorus compound, and a halogen compound from the group consisting of hydrogen halide acids, alkali metal halides, alkaline-earth metal halides and ammonium halides. More specifically, a greater improvement in the stability of a synthetic linear polyamide against embrittlement can be obtained by incorporating with the polymer a composition comprising a phosphorus compound from the group consisting of inorganic phosphorus acids and alkali metal salts thereof, and an inorganic halide. More particularly, the amount of phosphorus compound should preferably be 0.1% to 1.0% and the halogen compound ranges from 0.25% to 2.5%, based upon the weight of polyamide.

The following examples, in which all parts are by weight unless otherwise specified, are illustrative of various embodiments of the present invention.

*Example I.*—The following materials were added to a 30-gallon kettle in the following order with stirring, and the mixture was heated to 40°–50° C.:

| | Parts |
|---|---|
| Distilled water | 16,000 |
| Adipic acid | 7,900 |
| 80% hexamethylene diamine | 7,810 |

To the kettle were added 70 parts of a decolorizing carbon, and the pH was adjusted to 6.9–7 by suitable addition of acid or diamine. The resulting solution of hexamethylene diammonium adipate was then filtered through hydrated amorphous silica. To 26,000 parts of the resulting salt solution the folowing stabilizer composition was added to the salt solution:

| | Parts |
|---|---|
| Potassium bromide | 100 |
| Phosphorous acid | 25 |

The quantities of potassium bromide and phosphorous acid were thus 1% and 0.25% based upon the weight of polyamide.

The salt solution containing the above stabilizer composition was concentrated in a nitrogen atmosphere to 18,000 parts, and the concentrated solution was blanketed with nitrogen at 10 pounds per square inch pressure (gauge). The autoclave was closed and the polymerization was carried out according to the following schedule:

| Operation | Time (hrs.) | Temperature, °C. |
|---|---|---|
| Heating up to 250 p. s. i. | 1 | 55–215 |
| Heat at 250 p. s. i. and bleed steam | 3¾ | 215–250 |
| Reduce pressure to 0 | 1 | 250–275 |
| Pass slow nitrogen stream to autoclave | 1 | 275 |
| Close autoclave and increase nitrogen pressure to 100 p. s. i. | | 275 |
| Extrude (0.2 in beading) | ½ to 1 | 275 |

The beading was cut into molding powder and was tested to determine its stability against embrittlement upon exposure at elevated temperatures, as follows:

The polymer powder was dried in a mechanical convection oven at 120° C. for 4 hours. The polymer was then extruded through a screw stuffing machine into the form of a filament 0.04 inch in diameter. The filament (which could be cold-drawn at room temperature) was wrapped into coils and suspended in an oven at 150° C. From time to time a specimen of filament was taken out of the oven and cooled in a desiccator. After cooling, the specimen was wrapped tightly around a wire 0.04 inch in diameter to test the flexibility of the specimen. At the beginning of the test the specimens could be wrapped around the wire thousands of times without breakage. As the time in the oven increased, breakage occurred at a successively smaller number of turns. Finally the specimen broke when an average of only a few turns was made. When the filament broke before it could be wrapped around the wire 5 times in 50% of the trials, the time in the oven at 150° C., expressed in hours, was the measure of heat stability. For example, the heat stability of the polymer of this example was over 500 hours.

*Example II.*—The following table illustrates the heat stability of a synthetic linear polyamide stabilized with various compositions within the scope of the present invention. These compositions were added to the polyamide salt as illustrated in Example I, and polymerization was carried out in the manner described in that example.

pound and a halogen compound as defined herein.

The stabilizer compositions of the present invention are added preferably to the polyamide salt prior to the condensation reaction, which is preferably carried out at a temperature of 200° to 285° C., in a pressure-resistant vessel while bleeding (i. e. gradually releasing) therefrom the steam produced chemically from the condensation reaction. From the viewpoint of commercial operation this is the most efficient embodiment of the invention. However, the stabilizer composition may be added to the condensing reactants at any time during the condensation. Addition of the stabilizer to the molten polymer followed by homogenization by extrusion is also within the scope of the present invention. Blending of the stabilizer with solid particles of polyamide, i. e., molding powder, in a tumbler followed by extrusion of the solid particles is also a satisfactory method of incorporating stabilizer into polyamide.

Sodium and potassium bromide and iodide are the preferred halogen compounds for use in the stabilized compositions of this invention. Greater stability is obtained with a given quantity of the alkali metal bromides and iodides than with alkali metal chlorides. In general, a greater quantity of the alkali metal chloride is required to obtain optimum stabilization. Other halogen compounds which are included within the scope of the present invention are hydrogen halide acids, such as hydrochloric, hydrobromic, and hydriodic acids; alkaline-earth metal halides such as magnesium chloride; and ammonium halides such as ammonium chloride, bromide, and iodide. It is to be understood that halogen compounds containing fluorine are not included within the scope of the present invention.

Phosphorous acid is the preferred phosphorus compound for the present stabilizer compositions, however, phosphoric acid may also be used. In the absence of other stabilizers phosphorous acid and alkali metal dehydrogen phosphates, while stabilizing the intrinsic viscosity of the polymers, fail to stabilize the polymers against embrittlement due to ageing in the presence of air. Furthermore, various other phosphorous and phosphoric compounds which are readily hydrolyzable to the acids may be used in the practice of this invention. Particular compounds which have been found to be effective include sodium phosphites and phosphates; various alkyl phosphites and phosphates such as methyl, ethyl, propyl, and butyl phosphites and phosphates; various aryl phosphites and phosphates such as triphenyl

TABLE

*Effect of additives on heat stability of polyamides*

| Polyamide | Phosphorus Compound and percent by weight of polyamide | Halogen Compound and percent by weight of polyamide | Heat Stability, 150° C. in air-hours | Cold-drawing Properties of 0.04 inch beading at room temperature |
|---|---|---|---|---|
| Polyhexamethylene-adipamide | 0 | KI—0.5 | less than 65 | Could not be cold-drawn. |
| Do | 0 | KI—1 | 130 | Do. |
| Do | $H_3PO_3$—0.5 | 0 | 2 | Do. |
| Do | $H_3PO_3$—0.25 | KI—1 | 410 | Excellent. |
| Do | $H_3PO_3$—0.25 | KBr—1 | 500+ | Do. |
| Do | $NaH_2PO_4$—0.25 | KI—1 | 500 | Do. |
| Do | $NaH_2PO_4$—0.25 | KBr—1 | 500 | Do. |

It is to be understood that the foregoing examples are intended to be illustrative, and that the present invention broadly comprises stabilizing synthetic linear polyamides against embrittlement upon exposure to atmospheric conditions with a composition comprising a phosphorus compound and a halogen compound as defined herein.

phosphite and phosphate; and various cycloalkyl and aralkyl phosphites and phosphates.

In addition to the stabilizing action of the phosphorous compounds of the present invention it has been found that those phosphorous compounds defined herein act as catalysts in the polymerization of polyamides. This means that under comparable conditions of polymerization the viscosity of the resulting polyamide will be higher when polymerized in the presence of the herein defined phosphorous compounds than when polymerized in the absence thereof. For example, a polyhexamethylene adipamide polymerized in the presence of 0.25% of phosphorous acid, based upon the weight of polyamide, had a viscosity of 1.30, while the same polyamide polymerized in the absence of phosphorous acid at a viscosity of 1.10. Consequently, when a phosphorous compound is present in the stabilizing composition, it is necessary to reduce the duration of condensation in order to obtain a polymer having a particular viscosity, or a viscosity stabilizer such as acetic acid may be used. Such reductions in the duration of polymerization have an inherent tendency to improve the color stability of the resulting polymer.

Synthetic linear polyamides which can be stabilized according to the process of this invention are all those of the nylon type having an intrinsic viscosity above 0.4 as defined in U. S. Patent 2,130,948. Furthermore, polyamides formed by reaction of a dicarboxylic acid and a stereoisomeric mixture of di(p-aminocyclohexyl) methane as embodied in U. S. Patent 2,512,606 are also included within the scope of the present invention. Particular polyamides included among these which may be stabilized by the stabilizers of this invention are as follows: polyhexamethylene adipamide, polyhexamethylene sebacamide, polymerized 6-aminocaproic acid, polytetramethylene sebacamide, polytetramethylene adipamide, and polyadipamides prepared from di(p-aminocyclohexyl)ethane or 1,6-di(p-aminocyclohexyl) hexane as the diamine component. It is to be understood that interpolyamides prepared from mixtures of amino acids and dibasic acids and diamines as embodied in U. S. Patent 2,285,009 are also included within the scope of this invention. For purposes of this invention those polyamides in which recurring carbonamide groups are chemically modified after polymerization, e. g., by substitution of —H by —CH$_2$O—alkyl, are not included.

Polyamide compositions stabilized in accordance with this invention are white in color. This is in contrast with polymers stabilized solely with soluble copper compounds, since the latter are highly colored.

The compositions of this invention may be modified by the addition of other materials. Suitable modifying agents include plasticizers, resins, waxes, fillers and certain pigments. The form and use of the polyamide will determine which of these modifying agents are the more suitable.

The improved polyamides of this invention can be converted into any of the forms suitable for polyamides generally, such as yarns, tire cord, bristles, fabric, molded articles, films, and coating, for example, for filaments, textiles, wood, rubber, leather, and ceramic materials and are particularly useful in the above forms when intended to be exposed to elevated temperatures. Thus they form especially valuable textile fabrics by reason of their stability toward the high temperatures encountered in laundering, calendering, and ironing operations. By reason of their excellent durability, the compositions of the invention are especially useful, also, for electrical insulation, for example, as coating for magnet wires, electric blasting cap leading wires, and slot insulation for motors, movie film, sausage casings, and as coatings on materials which are exposed to elevated temperatures.

In my copending application S. N. 219,115, filed April 3, 1951, I have disclosed certain stabilized polyamides including some which are stabilized with a soluble copper compound in addition to the stabilizer components herein disclosed. The copper stabilized polyamides possess the most outstanding resistance to ageing, but for certain specific purposes the presence of copper cannot be tolerated. The present invention is especially effective when a stabilized nylon which does not contain copper is desired.

I claim:
1. A synthetic linear polycarbonamide which is stabilized against degradative effects of heat and oxygen by the addition of from 0.1 to 1% by weight of a phosphorous compound of the class consisting of phosphorous acids and alkali metal salts thereof and from 0.25 to 2.5% by weight of an alkali metal halide, said polyamide being one having recurring carbonamide groups as an integral part of the main polymer chain.
2. Polyhexamethylene diamine polyadipamide which is stabilized against degradative effects of heat and oxygen by the addition of from 0.1 to 1% by weight of a phosphorous compound of the class consisting of phosphorous acids and alkali metal salts thereof and from 0.25 to 2.5% by weight of a halide of the class consisting of potassium bromide and potassium iodide.
3. Polyhexamethylene diamine polyadipamide which is stabilized against degradative effects of heat and oxygen by the addition of from 0.1 to 1% by weight of H$_3$PO$_3$ and from 0.25 to 2.5% by weight of KI.
4. Polyhexamethylene diamine polyadipamide which is stabilized against degradative effects of heat and oxygen by the addition of from 0.1 to 1% by weight of H$_3$PO$_3$ and from 0.25 to 2.5% by weight of KBr.
5. Polyhexamethylene diamine polyadipamide which is stabilized against degradative effects of heat and oxygen by the addition of 0.1 to 1% by weight of NaH$_2$PO$_4$ and from 0.25 to 2.5% by weight of KI.
6. Polyhexamethylene diamine polyadipamide which is stabilized against degradative effects of heat and oxygen by the addition of 0.1 to 1% by weight of NaH$_2$PO$_4$ and from 0.25 to 2.5% by weight of KBr.

GELU S. STAMATOFF.

No references cited.